United States Patent
Liang et al.

(10) Patent No.: US 7,495,904 B2
(45) Date of Patent: Feb. 24, 2009

(54) FIXING APPARATUS OF DATA STORAGE DEVICE

(75) Inventors: Chun-Chi Liang, Guangdong (CN);
Guang-Yao Lee, Guangdong (CN);
Ji-Guo Xu, Guangdong (CN);
Hsuan-Tsung Chen, Guangdong (CN);
Guang-Ming Wang, Guangdong (CN);
Xiang-Yu Xiao, Guangdong (CN)

(73) Assignees: Hong Fu Jin Precision Industry (Shen Zhen) Co., Ltd., Longhua Town, Bao'an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 370 days.

(21) Appl. No.: 11/306,971

(22) Filed: Jan. 17, 2006

(65) Prior Publication Data
US 2007/0007415 A1    Jan. 11, 2007

(30) Foreign Application Priority Data
Jul. 6, 2005 (CN) .................... 2005 1 0035877

(51) Int. Cl.
*G06F 1/16* (2006.01)
(52) U.S. Cl. .................................. 361/685; 361/727
(58) Field of Classification Search ............... 248/27.1; 361/685, 727, 683, 684, 686; 312/332.1, 312/223.2, 333
See application file for complete search history.

(56) References Cited

U.S. PATENT DOCUMENTS

| | | | | |
|---|---|---|---|---|
| 5,262,923 | A * | 11/1993 | Batta et al. | 361/685 |
| 5,921,644 | A * | 7/1999 | Brunel et al. | 312/223.2 |
| 6,654,240 | B1 | 11/2003 | Tseng et al. | |
| 6,885,551 | B2 * | 4/2005 | Chen | 361/685 |
| 7,068,502 | B2 * | 6/2006 | Chen et al. | 361/685 |
| 7,088,579 | B1 * | 8/2006 | Konshak | 361/685 |
| 7,327,565 | B2 * | 2/2008 | Chen et al. | 361/685 |
| 2004/0095716 | A1 * | 5/2004 | McAlister | 361/685 |
| 2005/0128919 | A1 * | 6/2005 | Huang et al. | 369/75.11 |
| 2005/0174730 | A1 * | 8/2005 | Chen et al. | 361/685 |
| 2007/0279860 | A1 * | 12/2007 | Zheng et al. | 361/685 |

FOREIGN PATENT DOCUMENTS

| | | |
|---|---|---|
| CN | 2342442 Y | 10/1999 |
| CN | 2433708 Y | 6/2001 |
| CN | 2457644 Y | 10/2001 |
| CN | 2533501 Y | 1/2003 |
| CN | 2535899 Y | 2/2003 |

* cited by examiner

*Primary Examiner*—Amy J. Sterling
(74) *Attorney, Agent, or Firm*—Winston Hsu

(57) ABSTRACT

A fixing apparatus is provided for holding a data storage device which defines a hole in a side wall thereof. The fixing apparatus includes a drive bracket, and a receiving rack. The drive bracket includes a side panel. The receiving rack includes a side plate, a pin arranged on the side plate to engage in the hole of the data storage device, and a handle being lockable to the side panel of the drive bracket. The data storage device is slantways placed into the receiving rack from a side opposite to the side plate. The combined receiving rack and the data storage device is received in the drive bracket.

10 Claims, 6 Drawing Sheets

FIXING APPARATUS OF DATA STORAGE DEVICE

FIELD OF THE INVENTION

The present invention relates to fixing apparatuses of data storage devices, and particularly to a fixing apparatuses which readily mounts a data storage devices to a drive bracket.

DESCRIPTION OF RELATED ART

Generally speaking, when a computer is assembled, a drive bracket is mounted in a computer enclosure, and then data storage devices are fixed to the drive bracket. The data storage devices comprise various combinations of hard disk drives (HDDs), floppy disk drives (FDDs), and compact disk-read only memory (CD-ROM) drives.

A conventional data storage device is generally attached to a drive bracket by bolts or rails. However, fixing a data storage device to a drive bracket with bolts is unduly laborious and time-consuming. Furthermore, the computer enclosure needs extra operating space for carrying out the fixing operation. Fixing a data storage device in a drive bracket using rails is more convenient then using the above-described bolts. However, certain bolts are still needed to fix the rails to the drive bracket. Additionally, mounting systems using rails require a clearance between the data storage device and the drive bracket. This may cause electromagnetic interference (EMI) problems, and may lead to accumulation of static charges on the computer enclosure. Furthermore, the rails are generally made of plastic. This not only restricts grounding connection options between the data storage device and the drive bracket, but also tends to lead to extra maintenance because of the plastic rails easily wearing out and needing replacement.

What is desired, therefore, is to provide a fixing apparatus which readily attach a data storage device to a drive bracket.

SUMMARY OF INVENTION

In one preferred embodiment, a fixing apparatus is provided for holding a data storage device which defines a hole in a side wall thereof. The fixing apparatus includes a drive bracket, and a receiving rack. The drive bracket includes a side panel. The receiving rack includes a side plate, a pin arranged on the side plate to engage in the hole of the data storage device, and a handle being lockable to the side panel of the drive bracket. The data storage device is slantways placed into the receiving rack from a side opposite to the side plate. The combined receiving rack and the data storage device is received in the drive bracket.

Other advantages and novel features will become more apparent from the following detailed description of preferred embodiments when taken in conjunction with the accompanying drawings, in which:

DETAILED DESCRIPTION

Figure 1:
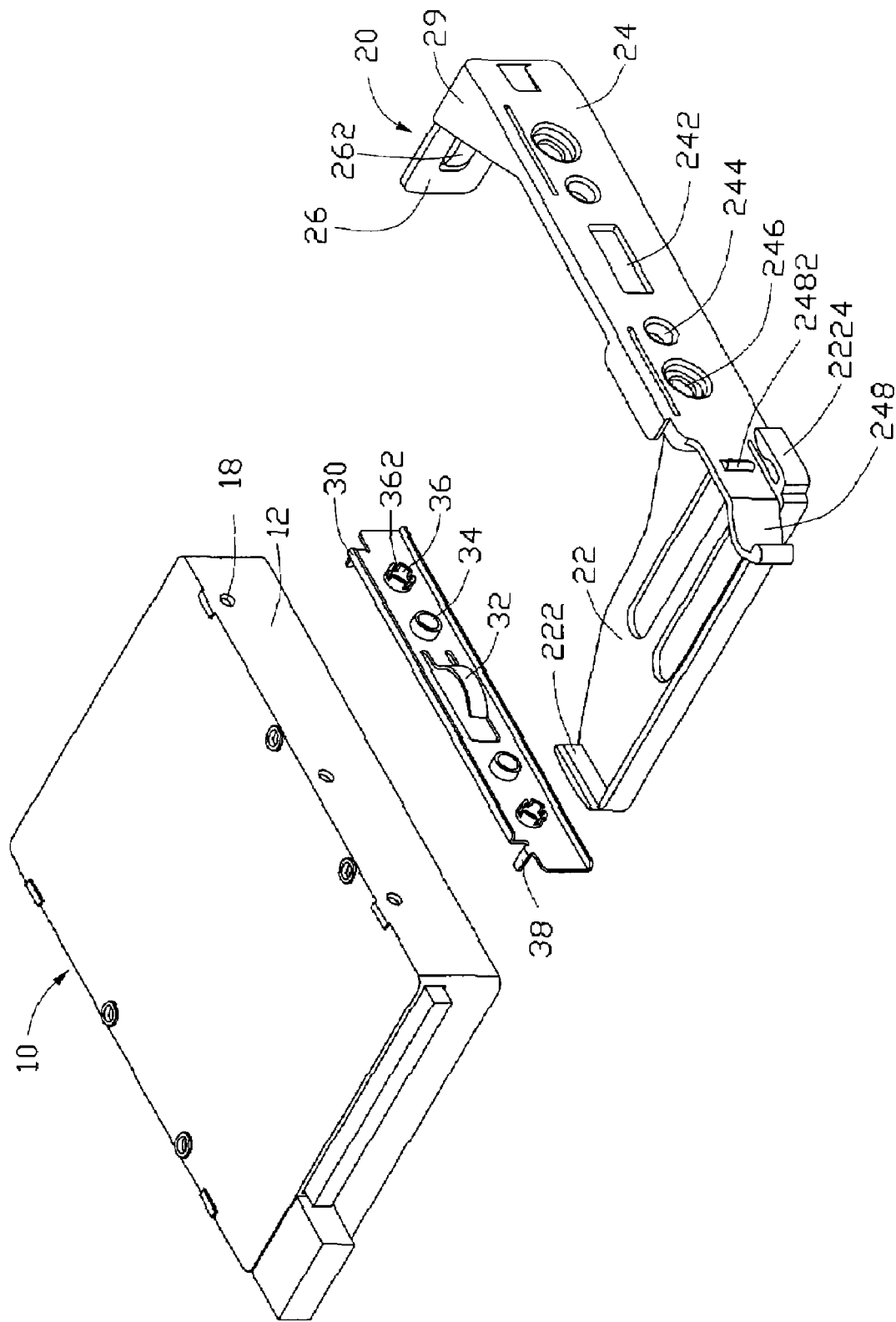
FIG. 1 is an explosive, isometric view of a receiving rack of a fixing apparatus in accordance with a preferred embodiment of the present invention, together with a data storage device.
Figure 2:
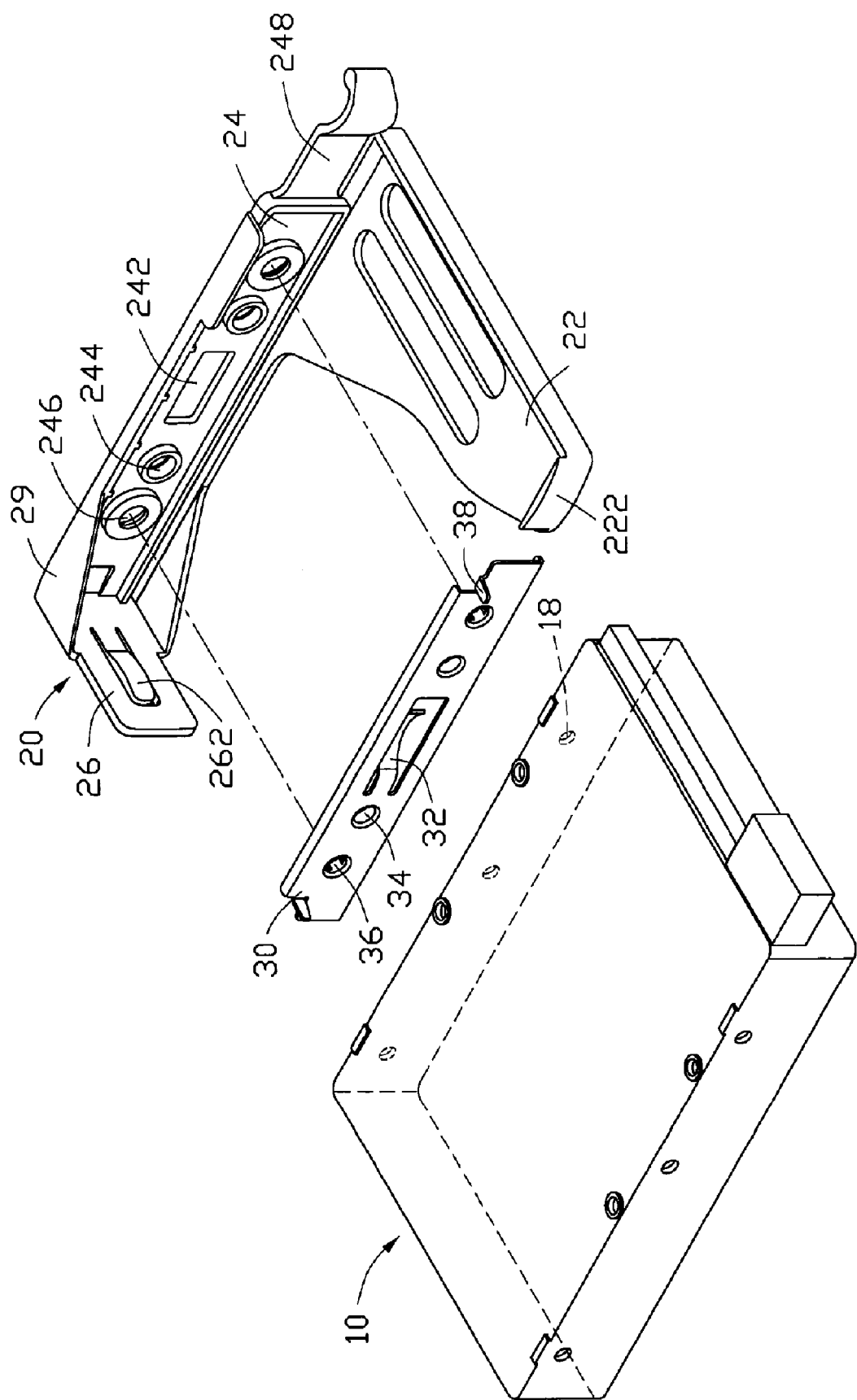
FIG. 2 is similar to FIG. 1, but viewed from another aspect.
Figure 5:
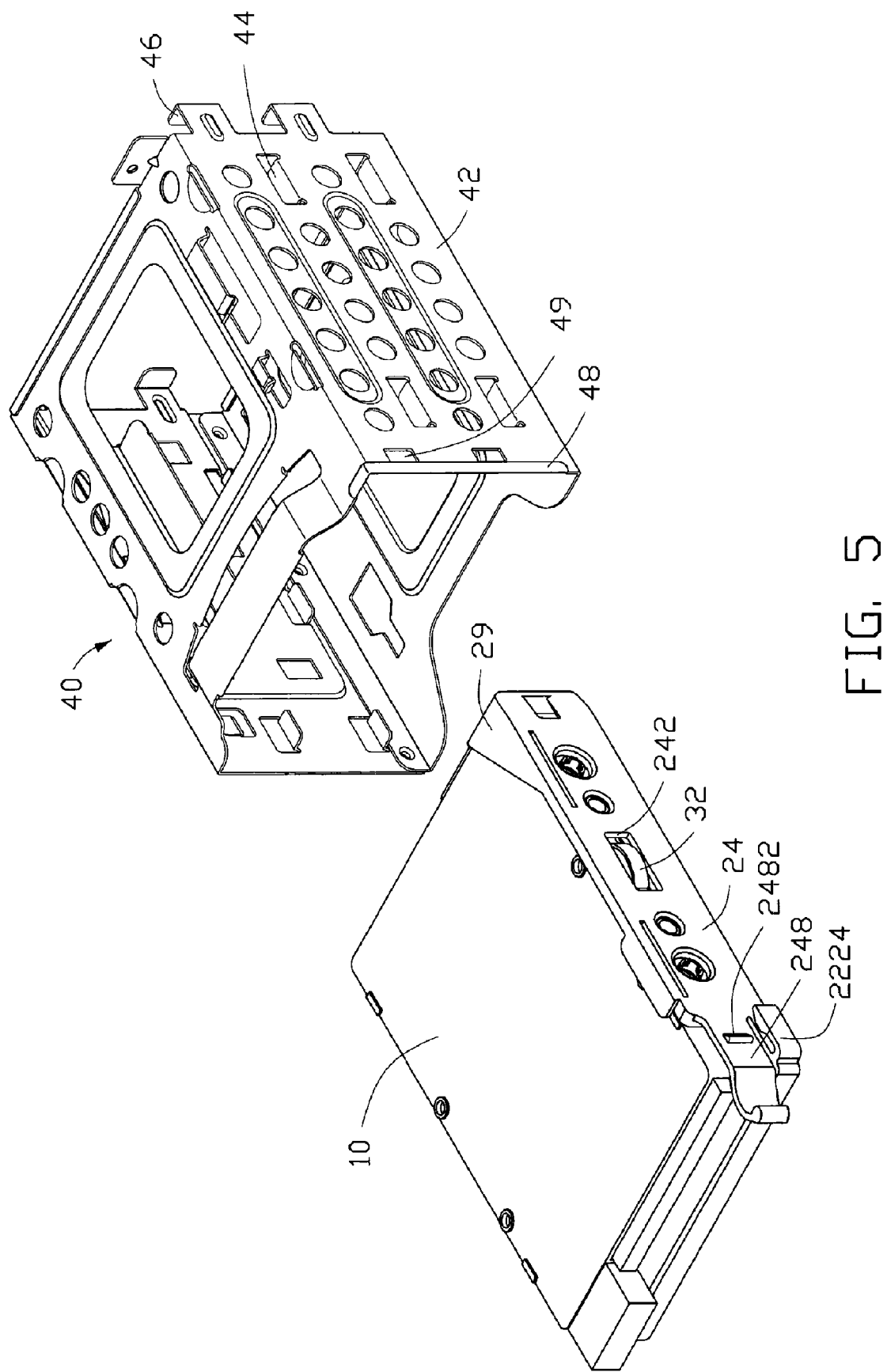
FIG. 5 is an isometric view of a drive bracket of the fixing apparatus and the assembled receiving rack and the data storage device of FIG. 4.

Referring to FIGS. 1, 2 and 5, a fixing apparatus in accordance with a preferred embodiment of the present invention is provided to attach a data storage device 10 to an electronic device (not shown) such as a computer. The fixing apparatus includes a receiving rack 20 for receiving the data storage device 10, and a drive bracket 40 fixed to the electronic device. In this embodiment, the data storage device 10 is a hard disk drive.

The receiving rack 20 is integrally formed by plastic, and includes a bottom plate 22, a side plate 24, and a rear plate 26. Two opposite sides and a front edge of a front portion of the bottom plate 22 respectively upwardly form a restricting flange 222. The other portion of the bottom plate 22 is cut off to save material. A rectangular slot 242 is defined in a middle of the side plate 24. A pair of positioning holes 244 is respectively defined in the side plate 24 at two opposite sides of the slot 242, and a pair of stepped mounting holes 246 is defined in the side plate 24 at two opposite sides of the positioning holes 244. A resilient handle 248 extends from a front of the side plate 24. A wedge-shaped locking block 2482 is formed outwardly from the handle 248. A clipping tab 2224 is formed from the restricting flange 222 corresponding to the handle 248. A resilient tab 262 is formed slightly inwardly from the rear plate 26 for clamping the data storage device 10. A top flange 29 extends inwardly from a top of the side plate 24.

The receiving rack 20 further includes a rectangular fixing plate 30. The fixing plate 30 is integrally formed by stamping a metal sheet. The fixing plate 30 includes an arc-shaped spring tab 32 extending outwardly therefrom, a pair of positioning posts 34 formed at opposite sides of the spring tab 32, and a pair of mounting posts 36 formed at opposite sides of the positioning posts 34. The positioning posts 34 and the mounting posts 36 are hollow. Each mounting post 36 defines a plurality of gaps 362 for facilitating riveting. A pair of pins 38 is bent perpendicularly inwardly from opposite ends of the fixing plate 30. In assembly, the fixing plate 30 is placed to an inner side of the side plate 24 of the receiving rack 20. The positioning posts 34 of the fixing plate 30 enter corresponding positioning holes 244 of side plate 24, the spring tab 32 extends through the slot 242 of the side plate 24, and the mounting posts 34 enter corresponding mounting holes 246 of the side plate 24. The mounting posts 34 are riveted from an outer side of the side plate 24, thereby mounting the fixing plate 30 to the receiving rack 20.

The data storage device 10 includes a side wall 12 defining two apertures 18 corresponding to the pins 38 of the fixing plate 30.

The drive bracket 40 includes two side panels 42. A plurality of supporting tabs 44 is stamped inwardly from the side panels 42. Two L-shaped blocking tabs 46 are formed from rear edges of the side panels 42, respectively. A rim 48 is bent outwardly from a front edge of one side panel 42. A locking hole 49 is defined in the side panel 42 adjacent the rim 48.

Figure 3:
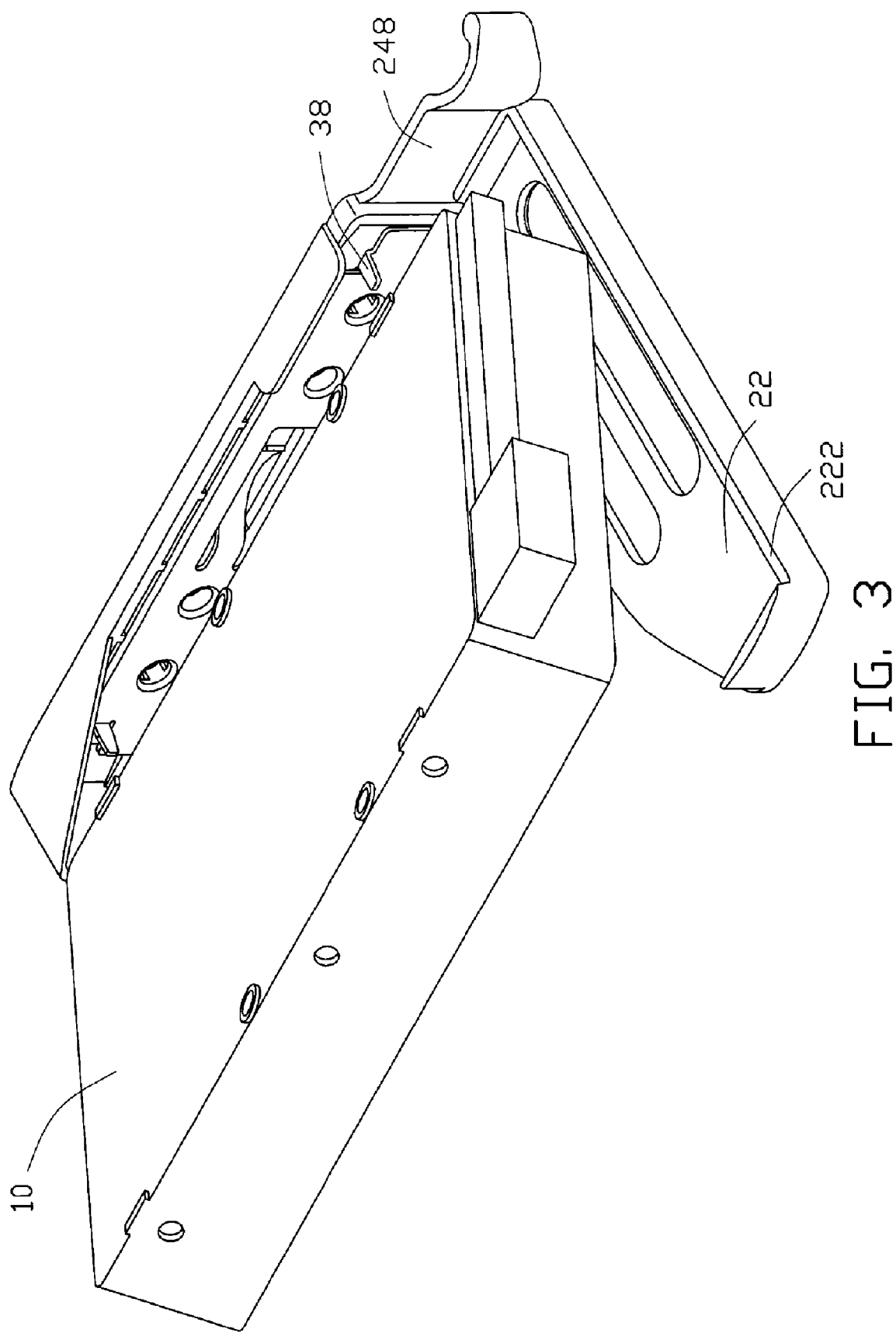
FIGS. 3 and 4 are assembled views of FIG. 1, showing an assembling process.
Figure 4:
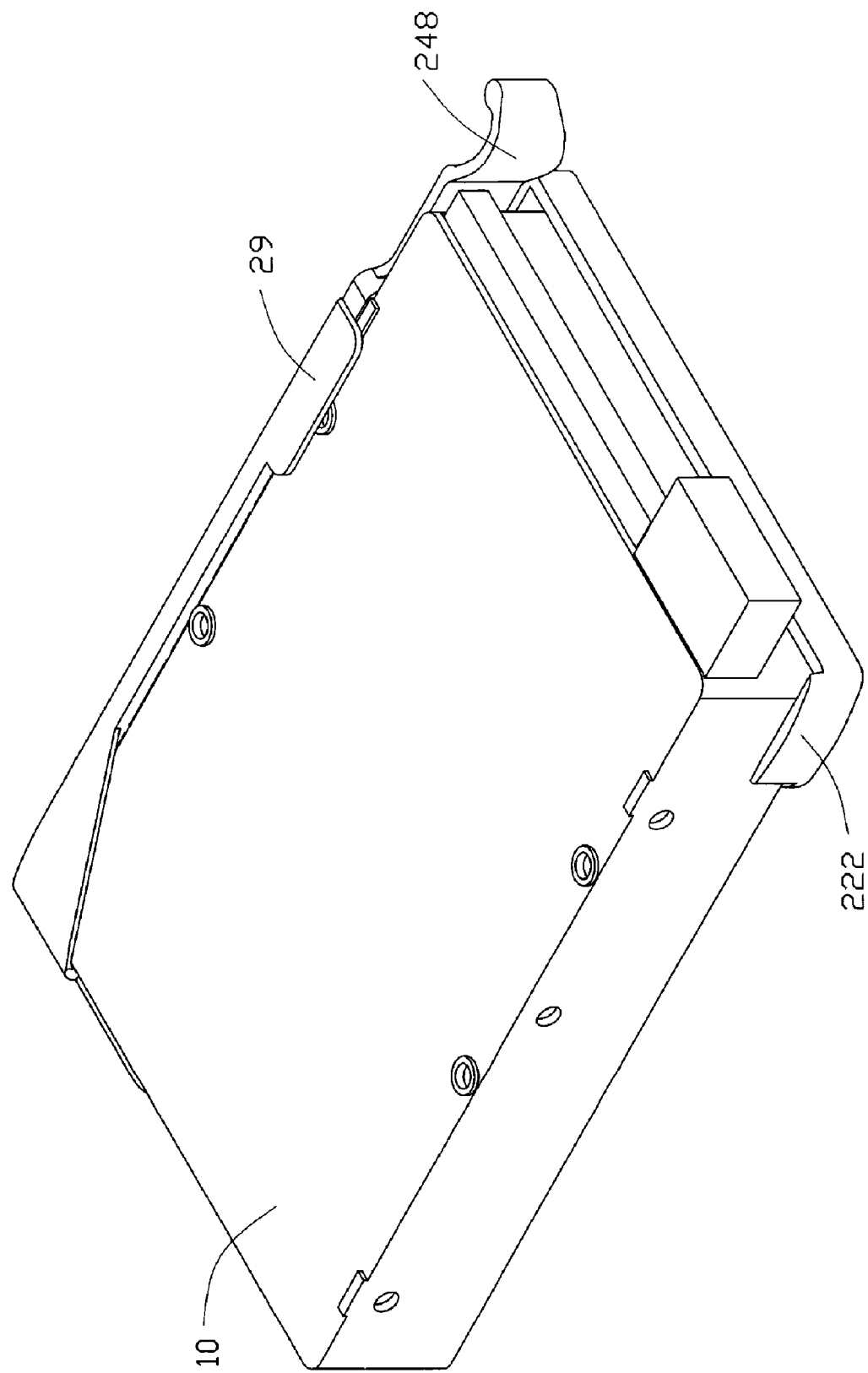

Referring also to FIGS. 3 and 4, the data storage device 10 is slantways placed into the receiving rack 20 from the side opposite to the side plate 24, with the pins 38 of the receiving rack 20 engaging into the apertures 18 of the data storage device 10, the data storage device 10 is then horizontally placed down. The data storage device 10 is thus secured in a receiving space defined by the bottom plate 22 and its restricting flange 222, the side plate 24, the rear plate 26, and the top flange 29 to form a data storage device module. The module can be lift via a single hand.

Figure 6:
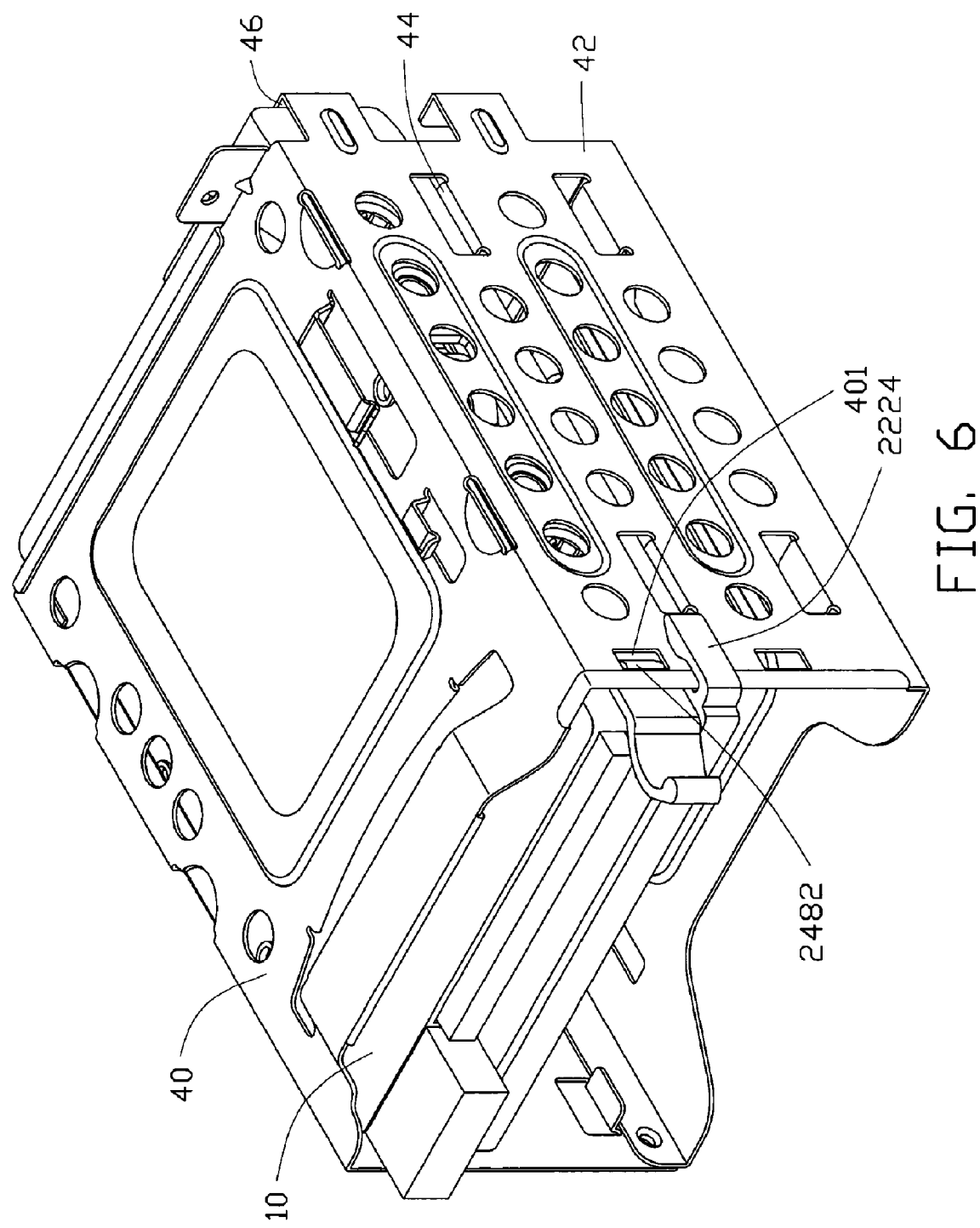
FIG. 6 is an assembled view of FIG. 5.

Referring also to FIGS. 5 and 6, the module is pushed into the drive bracket 40 along the supporting tabs 44, until the blocking tabs 46 stop the module. At this time, the locking block 2482 of the receiving rack 20 is resiliently engaged into the locking hole 49 of the drive bracket 40, and the clipping tab 2224 engages with the rim 48 of the drive bracket 40. The spring tab 32 of the fixing plate 30 extends through the slot 242 of the receiving rack 20 to abut against the side panel 42 of the drive bracket 40 for vibration absorption and preventing EMI.

In disassembly, the handle 248 of the receiving rack 20 is grabbed by a single hand and moved inwardly, so that the locking block 2482 is withdrawn from the locking hole 49 of the drive bracket 40. The handle 248 can be easily taken out from the drive bracket 40 by the single hand grabbing the handle 248.

In this embodiment, the data storage device 10 and the receiving rack 20 is combined to form a module. The module can be easily moved in or out from the drive bracket 40. In addition, it is convenient that the data storage device 10 is secured in the receiving rack 20 via the pins 38 extending into the apertures 18 and the clamping force of the plates and flanges.

It is believed that the present embodiment and its advantages will be understood from the foregoing description, and it will be apparent that various changes may be made thereto without departing from the spirit and scope of the invention or sacrificing all of its material advantages, the example hereinbefore described merely being a preferred or exemplary embodiment.

What is claimed is:

1. A fixing apparatus for holding a data storage device which defines a hole in a side wall thereof, the fixing apparatus comprising:
    a drive bracket comprising a side panel; and
    a receiving rack comprising a bottom plate for supporting a bottom wall of the data storage device, a side plate extending perpendicularly from a first side of the bottom plate, and a restricting flange extending perpendicularly from a second side of the bottom plate opposite to the first side, a pin arranged on the side plate to engage in the hole of the data storage device, and a handle being lockable to the side panel of the drive bracket;
    wherein the restricting flange is parallel to the side plate, and has a height shorter than that of the side plate so that the data storage device is capable of being slantways placed into the receiving rack from the second side, at which place the side plate and the restricting flange sandwich two opposite side walls of the data storage device, then the receiving rack is placed into the drive bracket;
    wherein the receiving rack further comprises a top flange extending inwardly from the side plate for abutting against a top wall of the data storage device.

2. The fixing apparatus as claimed in claim 1, wherein the receiving rack further comprises a metal fixing plate, and the pin is formed from the fixing plate.

3. The fixing apparatus as claimed in claim 2, wherein the fixing plate forms at least one positioning post and at least one mounting post, respectively engaging into at least one positioning hole and at least one mounting hole of the side plate.

4. The fixing apparatus as claimed in claim 2,
    wherein the side plate defines a slot, the fixing plate forms a spring tab outwardly, and the spring tab extends through the slot to abut against the side panel of the drive bracket.

5. The fixing apparatus as claimed in claim 1, wherein the receiving rack further comprises a rear plate extending perpendicular to the side plate, and a resilient tab formed inwardly from the rear plate for clamping the data storage device.

6. The fixing apparatus as claimed in claim 1, wherein the side panel of the drive bracket defines a locking hole, the handle integrally extends from and along the side plate, the receiving rack slides along an inner side of the side panel, a locking block is formed outwardly from the handle to snappingly engage in the locking hole from the inner side of the side panel.

7. The fixing apparatus as claimed in claim 1, wherein the receiving rack forms a clipping tab for clamping a front rim of the side panel of the drive bracket.

8. A fixing apparatus for holding a data storage device, comprising:
    a drive bracket comprising a side panel; and
    a receiving rack comprising a receiving space defined by a bottom plate, a restricting flange extending from a front portion of the bottom plate, a rear plate, a side plate, and a top flange extending from a top edge of the side plate, a handle extending forwardly from the side plate and engaging with the side panel;
    wherein the data storage device is slantways placed into the receiving space and secured therein, the combined receiving rack and the data storage device is received in the drive bracket;
    wherein the receiving rack further comprises a metal fixing plate mounting to the side plate; and
    wherein the side plate defines a slot, the fixing plate forms a spring tab to extend through the slot and abut against the side panel of the drive bracket.

9. The fixing apparatus as claimed in claim 8, wherein the data storage device defines an aperture in a side wall thereof, the fixing plate forms a pin to engage in the aperture.

10. The fixing apparatus as claimed in claim 8, wherein the fixing plate forms two mounting posts, the side plate defines two stepped mounting holes, and the mounting posts extend through the mounting holes respectively and are riveted.

\* \* \* \* \*